United States Patent
Sonnier

Patent Number: 5,934,185
Date of Patent: Aug. 10, 1999

[54] BOILING POT EGG SUPPORT SYSTEM

[76] Inventor: Kay W. Sonnier, 10010 Merwin Ct., Mobile, Ala. 36695

[21] Appl. No.: 09/243,522

[22] Filed: Feb. 1, 1999

[51] Int. Cl.$^6$ .............................. A47J 27/00; A47J 29/00; A47J 29/02; A47J 37/00
[52] U.S. Cl. ................................ 99/440; 99/336; 99/415; 99/417; 99/426; 99/448; 211/181.1
[58] Field of Search ............................. 99/331–336, 339, 99/340, 403–418, 448–450, 426, 427; 126/369, 374, 392, 388; 211/14, 74, 181.1, 96, 194; 219/441, 439, 401, 461; 220/490, 771; 248/346.01; 294/26.5; 426/300, 231, 523; D7/409, 357, 354, 611

[56] References Cited

U.S. PATENT DOCUMENTS

| | | | |
|---|---|---|---|
| 681,936 | 9/1901 | Soady | 99/440 |
| 745,196 | 11/1903 | King et al. | 99/336 |
| 1,184,812 | 5/1916 | Berger | 99/440 X |
| 1,406,222 | 2/1922 | Polo et al. | 211/181.1 |
| 1,500,544 | 7/1924 | Brockley | 99/418 X |
| 1,548,242 | 8/1925 | Anderson | 99/440 |
| 1,810,258 | 6/1931 | Sperber | 99/415 X |
| 2,226,844 | 12/1940 | Carr | 53/1 |
| 2,402,883 | 6/1946 | Gavalis | 99/440 |
| 2,545,308 | 3/1951 | Ritchie | 99/440 |
| 3,831,508 | 8/1974 | Wallard | 99/440 |
| 3,911,806 | 10/1975 | Thomison | 99/411 |
| 4,276,820 | 7/1981 | Joannou | 426/231 X |
| 4,656,928 | 4/1987 | Mack | 99/419 |
| 4,798,133 | 1/1989 | Johnson | 99/450 X |
| 4,862,793 | 9/1989 | Steiner | 99/426 X |
| 4,908,487 | 3/1990 | Sarnoff et al. | 99/448 X |
| 5,494,253 | 2/1996 | Snow | 211/194 X |
| 5,662,027 | 9/1997 | Neville et al. | 99/415 |

Primary Examiner—Timothy F. Simone
Attorney, Agent, or Firm—Joseph N. Breaux

[57] ABSTRACT

A boiling pot egg support system that includes egg supports for holding and supporting each of the eggs to be boiled in a manner to prevent collisions between the eggs during the boiling process. The boiling pot egg support system also includes multiple interconnectable egg support structures that are connectable to allow a user to adapt the boiling pot egg support system to the number of eggs to be boiled. A lifting assembly is provided for lifting the interconnectable egg support structures from a boiling pot.

1 Claim, 3 Drawing Sheets

BOILING POT EGG SUPPORT SYSTEM

TECHNICAL FIELD

The present invention relates to food preparation devices and more particularly to a boiling pot egg support system for supporting and separating eggs to be boiled in a boiling pot that includes a lifting assembly and first and second interconnectable egg support structures; the lifting assembly including a screw on gripping ring, a telescoping center section with a rectangular cross section and a flexible, two-sided, lifting hook; the first and second interconnectable egg support structures each having a perimeter rim, a center lifting structure, six equally spaced, oval-shaped, egg supports fixed between the perimeter rim and the center lifting structure, four support legs extending from the bottom side of the perimeter rim, and four support leg receiving connectors extending from the top side of the perimeter rim; the first egg support having a center lifting structure with a first and elongated rectangular lifting assembly attachment slot sized to form a keyway for receiving the telescoping center section of the lifting assembly; the longitudinal axis of the first elongated rectangular lifting assembly attachment slot being directed between the four support leg receiving connectors; the second egg support structure having a center lifting structure with a second elongated rectangular lifting assembly attachment slot with the longitudinal axis thereof directed between the four support legs such that when the support legs of the second interconnectable egg support structure are inserted into the four support leg receiving connectors of the first interconnectable egg support structure, the first and second elongated rectangular lifting assembly attachment slots are in registration, and the oval-shaped egg supports of the second interconnectable egg support structure are positioned above the spaces between the oval-shaped egg supports of the first interconnectable egg support structures in a manner to maximize the number of eggs positioned within a given height of a boiling pot; the flexible, two-sided, attachment hook being of a length, orientation and flexibility to flex and pass through each of the first and second elongated rectangular lifting assembly attachment slots only in a first direction and sufficiently inflexible to transmit a lifting force in a direction opposite the first direction sufficient to lift the first and second interconnectable egg support structures.

BACKGROUND ART

The movement of the eggs within a boiling pot when boiling a large number of eggs can result in collisions between the eggs and many broken egg shells. It would be a benefit, therefore, to have a boiling pot egg support system that included an egg support for holding and supporting each of the eggs to be boiled in a manner to prevent collisions between the eggs during the boiling process and, thereby, increase the number of eggs that can be successfully boiled in a given sized pot. Because different numbers of eggs can need to be boiled at different times, it would be a further benefit to have a boiling pot egg support system that included multiple interconnectable egg support structures that allowed a user to adapt the boiling pot egg support system to the number of eggs to be boiled.

GENERAL SUMMARY DISCUSSION OF INVENTION

It is thus an object of the invention to provide a boiling pot egg support system that includes egg supports for holding and supporting each of the eggs to be boiled in a manner to prevent collisions between the eggs during the boiling process.

It is a further object of the invention to provide a boiling pot egg support system that includes multiple interconnectable egg support structures that are connectable to allow a user to adapt the boiling pot egg support system to the number of eggs to be boiled.

It is a still further object of the invention to provide a boiling pot egg support system that includes a lifting assembly and first and second interconnectable egg support structures; the lifting assembly including a screw on gripping ring, a telescoping center section with a rectangular cross section and a flexible, two-sided, lifting hook; the first and second interconnectable egg support structures each having a perimeter rim, a center lifting structure, six equally spaced, oval-shaped, egg supports fixed between the perimeter rim and the center lifting structure, four support legs extending from the bottom side of the perimeter rim, and four support leg receiving connectors extending from the top side of the perimeter rim; the first egg support having a center lifting structure with a first and elongated rectangular lifting assembly attachment slot sized to form a keyway for receiving the telescoping center section of the lifting assembly; the longitudinal axis of the first elongated rectangular lifting assembly attachment slot being directed between the four support leg receiving connectors; the second egg support structure having a center lifting structure with a second elongated rectangular lifting assembly attachment slot with the longitudinal axis thereof directed between the four support legs such that when the support legs of the second interconnectable egg support structure are inserted into the four support leg receiving connectors of the first interconnectable egg support structure, the first and second elongated rectangular lifting assembly attachment slots are in registration, and the oval-shaped egg supports of the second interconnectable egg support structure are positioned above the spaces between the oval-shaped egg supports of the first interconnectable egg support structures in a manner to maximize the number of eggs positioned within a given height of a boiling pot; the flexible, two-sided, attachment hook being of a length, orientation and flexibility to flex and pass through each of the first and second elongated rectangular lifting assembly attachment slots only in a first direction and sufficiently inflexible to transmit a lifting force in a direction opposite the first direction sufficient to lift the first and second interconnectable egg support structures.

It is a still further object of the invention to provide a boiling pot egg support system that accomplishes some or all of the above objects in combination.

Accordingly, a boiling pot egg support system is provided. The boiling pot egg support system includes a lifting assembly and first and second interconnectable egg support structures; the lifting assembly including a screw on gripping ring, a telescoping center section with a rectangular cross section and a flexible, two-sided, lifting hook; the first and second interconnectable egg support structures each having a perimeter rim, a center lifting structure, six equally spaced, oval-shaped, egg supports fixed between the perimeter rim and the center lifting structure, four support legs extending from the bottom side of the perimeter rim, and four support leg receiving connectors extending from the top side of the perimeter rim; the first egg support having a center lifting structure with a first and elongated rectangular lifting assembly attachment slot sized to form a keyway for receiving the telescoping center section of the lifting assembly; the longitudinal axis of the first elongated rectangular lifting assembly attachment slot being directed between the four support leg receiving connectors; the second egg support structure having a center lifting structure with a second elongated rectangular lifting assembly attachment slot with the longitudinal axis thereof directed between the four support legs such that when the support legs of the second interconnectable egg support structure are inserted into the four support leg receiving connectors of the first interconnectable egg support structure, the first and second elongated rectangular lifting assembly attachment slots are in registration, and the oval-shaped egg supports of the second interconnectable egg support structure are positioned above the spaces between the oval-shaped egg supports of the first interconnectable egg support structures in a manner to maximize the number of eggs positioned within a given height of a boiling pot; the flexible, two-sided, attachment hook being of a length, orientation and flexibility to flex and pass through each of the first and second elongated rectangular lifting assembly attachment slots only in a first direction and sufficiently inflexible to transmit a lifting force in a direction opposite the first direction sufficient to lift the first and second interconnectable egg support structures. In a preferred embodiment, the boiling pot egg support system includes additional first and/or second interconnectable egg support structures.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
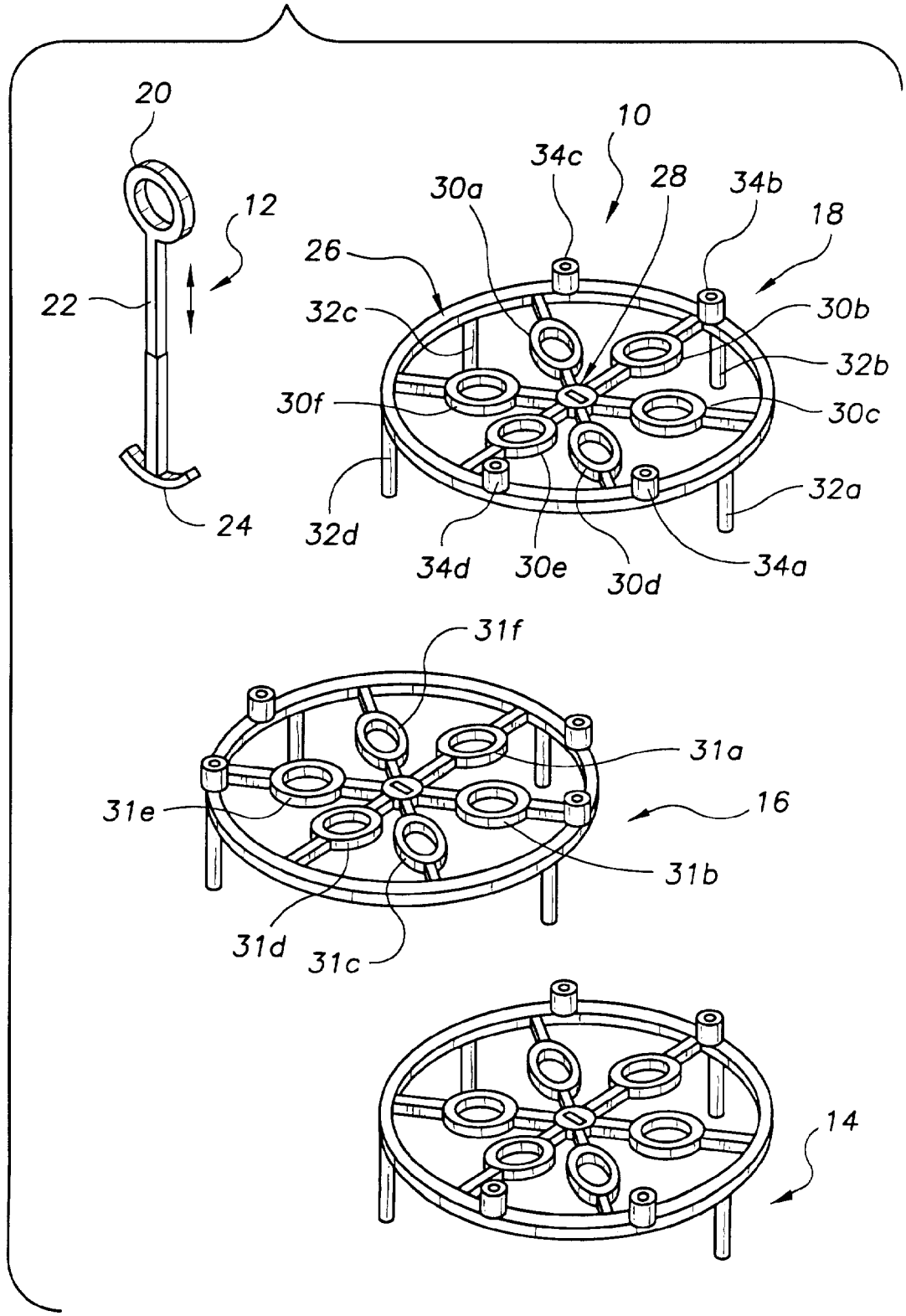
FIG. 1 is a perspective view of an exemplary embodiment of the boiling pot egg support system of the present invention showing a lifting assembly including a screw on gripping ring, a telescoping center section with a rectangular cross section and a flexible, two-sided, lifting hook; and the first, second and third interconnectable egg support structures each with a perimeter rim, a center lifting structure, six equally spaced, oval-shaped, egg supports fixed between the perimeter rim and the center lifting structure, four support legs extending from the bottom side of the perimeter rim, and four support leg receiving connectors extending from the top side of the perimeter rim; the first and third egg support structures are identical, each having a center lifting structure with a first and a third identical elongated rectangular lifting assembly attachment slot, respectively, sized to form a keyway for receiving the telescoping center section of the lifting assembly; the longitudinal axis of each of the first and third elongated rectangular lifting assembly attachment slot being directed between the four support leg receiving connectors; the second egg support structure having a center lifting structure with a second elongated rectangular lifting assembly attachment slot with the longitudinal axis thereof directed between the four support legs such that when the support legs of the second interconnectable egg support structure are inserted into the four support leg receiving connectors of the first interconnectable egg support structure and the support legs of the third interconnectable egg support structure are inserted into the four support leg receiving connectors of the second interconnectable egg support structure, the first, second and third elongated rectangular lifting assembly attachment slots are in registration, the oval-shaped egg supports of the first and third interconnectable egg support structures are in registration, and the oval-shaped egg supports of the second interconnectable egg support structure are positioned above and below, respectively, the spaces between the oval-shaped egg supports of the first and third interconnectable egg support structures in a manner to maximize the number of eggs positioned within a given height of a boiling pot; the flexible, two-sided, attachment hook being of a length, orientation and flexibility to flex and pass through each of the first, second and third elongated rectangular lifting assembly attachment slots only in a first direction and sufficiently inflexible to transmit a lifting force in a direction opposite the first direction sufficient to lift the first, second, and third interconnectable egg support structures.

FIG. 1 shows an exemplary embodiment of the boiling pot egg support system of the present invention, generally designated 10. Boiling pot egg support system 10, includes a lifting assembly, generally designated 12; and first, second and third interconnectable egg support structures, respectively generally designated 14,16,18. Lifting assembly 12 is of metal construction and includes a screw on gripping ring 20, a telescoping center section 22 with a rectangular cross section, and a flexible, two-sided, lifting hook 24.

First, second and third interconnectable egg support structures 14,16,18 are of metal construction and each include a perimeter rim, generally designated 26; a center lifting structure generally designated 28; six equally spaced, oval-shaped, egg supports 30a–f (31a–f for second egg support structure 16); fixed between perimeter rim 26 and center lifting structure 28, four support legs 32a–d that extend from the bottom side of perimeter rim 26, and four support leg receiving connectors 34a–d that extend from the top side of perimeter rim 26.

Figure 2:
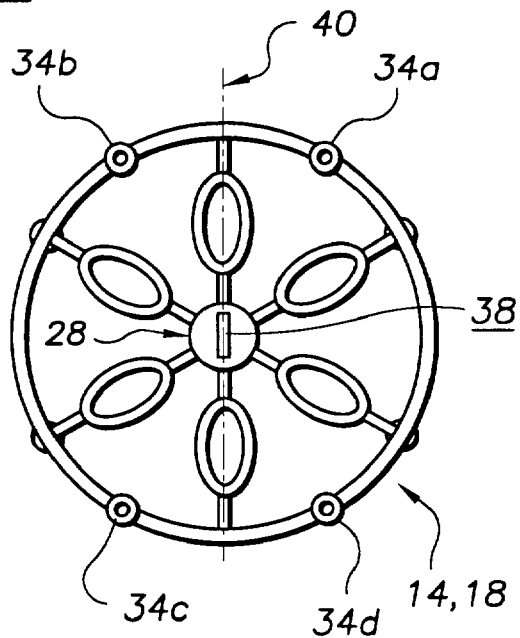
FIG. 2 is a top plan view of one of the identical first and third interconnectable egg support structures showing the perimeter rim, the center lifting structure with the elongated rectangular lifting assembly attachment slot, the six equally spaced, oval-shaped, egg supports fixed between the perimeter rim and the center lifting structure, the four support legs extending from the bottom side of the perimeter rim, and the four support leg receiving connectors extending from the top side of the perimeter rim; the longitudinal axis of the elongated rectangular lifting assembly attachment slot being directed between the four support leg receiving connectors.
Figure 3:
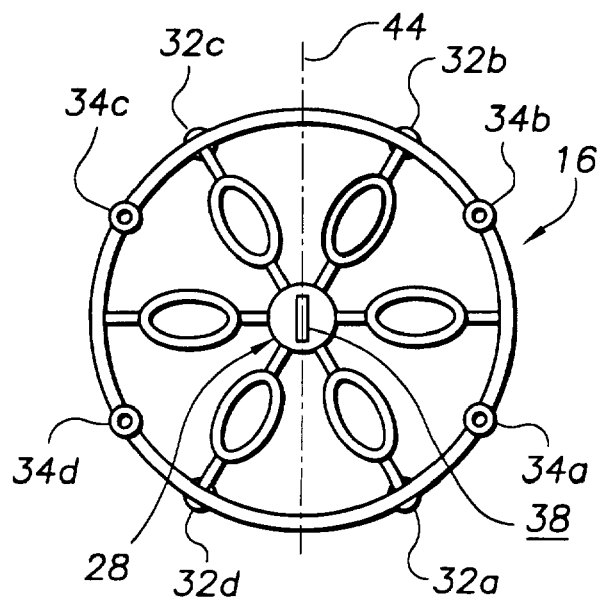
FIG. 3 is a top plan view showing the second interconnectable egg support structure showing the perimeter rim, the center lifting structure with the elongated rectangular lifting assembly attachment slot, the six equally spaced, oval-shaped, egg supports fixed between the perimeter rim and the center lifting structure, the four support legs extending from the bottom side of the perimeter rim, and the four support leg receiving connectors extending from the top side of the perimeter rim; the longitudinal axis of the elongated rectangular lifting assembly attachment slot being directed between the four support legs.
Figure 4:
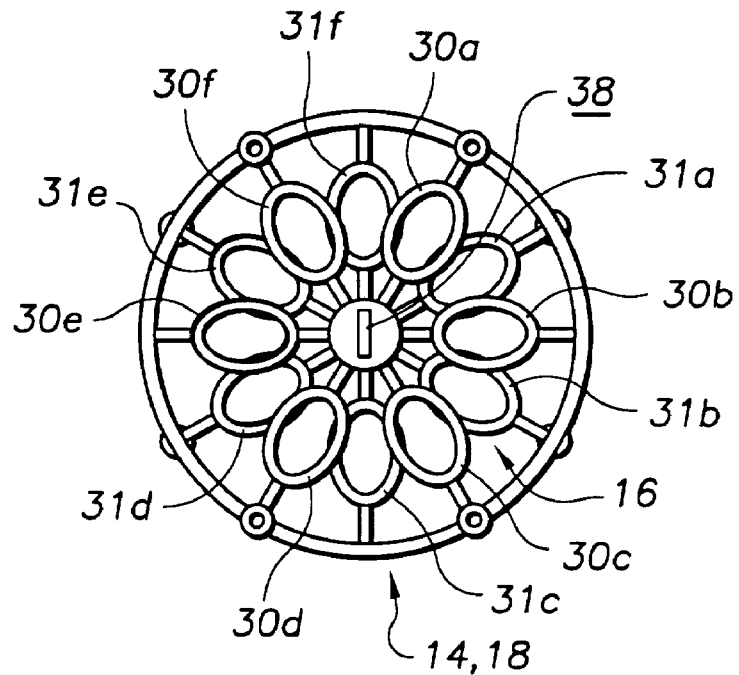
FIG. 4 is a top plan view showing the third, second and first interconnectable egg support structures stacked one atop the other, in that order, showing the first, second and third elongated rectangular lifting assembly attachment slots in registration and the oval-shaped egg supports of the second interconnectable egg support structure positioned below and through the spaces between the oval-shaped egg supports of the third interconnectable egg support structure.

With respect to FIG. 2, first and third interconnectable egg support structures 14,18 are identical, each having a center lifting structure 28 with a first and a third identical elongated rectangular lifting assembly attachment slot designated 38 sized to form a keyway for receiving telescoping center section 22 (FIG. 1) of lifting assembly 12 (FIG. 1). The longitudinal axis 40 of each of first and third elongated rectangular lifting assembly attachment slots 38 is directed between support leg receiving connector pairs 34a,34b, and 34c,34d. With reference to FIG. 3, second egg support structure 16 has a center lifting structure 28 with second elongated rectangular lifting assembly attachment slot 38 with the longitudinal axis 44 thereof directed between the support leg pairs 32b,32c, and 32a,32d such that when the support legs 32a–d of second interconnectable egg support structure 16 are inserted into the four support leg receiving connectors 34a–d (FIG. 2) of first interconnectable egg support structure 14, and the support legs 32a–d (FIG. 1) of third interconnectable egg support structure 18 are inserted into the four support leg receiving connectors 34a–d of second interconnectable egg support structure 16 (FIG. 3), with reference now to FIG. 4, the first, second and third elongated rectangular lifting assembly attachment slots 38 are in registration, the oval-shaped egg supports 30a–f of the first and third interconnectable egg support structures 14,18 are in registration, and the oval-shaped egg supports 31a–f of the second interconnectable egg support structure 16 are positioned above and below, respectively, the spaces between the oval-shaped egg supports 30a–f of first and third interconnectable egg support structures 14,18 in a manner to maximize the number of eggs positioned within a given height of a boiling pot.

Figure 5:
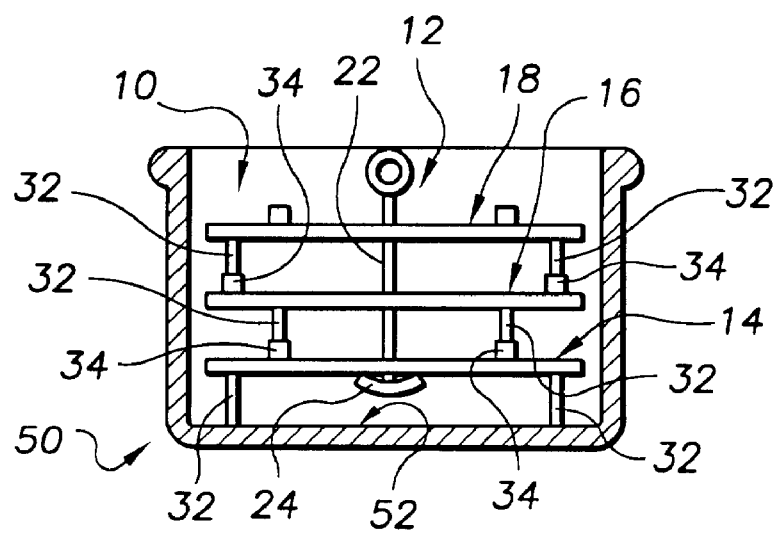
FIG. 5 is side plan view of a representative boiling pot having a portion of the boiling pot side wall removed to show the boiling pot egg support system of FIG. 1 positioned therein with the support legs of the second interconnectable egg support structure inserted into the four support leg receiving connectors of the first interconnectable egg support structure; the support legs of the third interconnectable egg support structure inserted into the four support leg receiving connectors of the second interconnectable egg support structure; the telescoping center section of the lifting assembly inserted through the in registration first, second and third elongated rectangular lifting assembly attachment slots; and the flexible, two-sided, attachment hook positioned beneath the center lifting structure of the first interconnectable egg support structure.

FIG. 5 shows a representative boiling pot, generally designated 50, having a portion of the boiling pot side wall removed to show the boiling pot egg support system 10 of FIG. 1 positioned therein with the support legs 32 of first interconnectable egg support structure 14 supported on pot bottom 52; the support legs 32 of second interconnectable egg support structure 16 inserted into the four support leg receiving connectors 34 of first interconnectable egg support structure 14; the support legs 32 of third interconnectable egg support structure 18 inserted into the four support leg receiving connectors 34 of second interconnectable egg support structure 16; the telescoping center section 22 of lifting assembly 12 inserted through the in registration first, second and third elongated rectangular lifting assembly attachment slots 38 (see FIG. 4); and flexible, two-sided, attachment hook positioned beneath the center lifting structure 28 (FIG. 2) of first interconnectable egg support structure 14. During assembly prior to each use, eggs to be boiled are inserted into the oval-shaped egg supports 30a–f,31a–f of each interconnectable egg support structure 14,16 before the next interconnectable egg support structure 16,18 is attached as previously described. Once the eggs are boiled, boiling pot egg support system 10 is removed from pot 50 by grasping and lifting gripping ring 20 (FIG. 1) to lift first, second and third interconnectable egg support structures 14,16,18 from the boiling pot; unscrewing gripping ring 20; and removing the eggs in the reverse order in which they were inserted.

It can be seen from the preceding description that a boiling pot egg support system has been provided that includes egg supports for holding and supporting each of the eggs to be boiled in a manner to prevent collisions between the eggs during the boiling process; that includes multiple interconnectable egg support structures that are connectable to allow a user to adapt the boiling pot egg support system to the number of eggs to be boiled; and that includes a lifting assembly and first and second interconnectable egg support structures; the lifting assembly including a screw on gripping ring, a telescoping center section with a rectangular cross section and a flexible, two-sided, lifting hook; the first and second interconnectable egg support structures each having a perimeter rim, a center lifting structure, six equally spaced, oval-shaped, egg supports fixed between the perimeter rim and the center lifting structure, four support legs extending from the bottom side of the perimeter rim, and four support leg receiving connectors extending from the top side of the perimeter rim; the first egg support having a center lifting structure with a first and elongated rectangular lifting assembly attachment slot sized to form a keyway for receiving the telescoping center section of the lifting assembly; the longitudinal axis of the first elongated rectangular lifting assembly attachment slot being directed between the four support leg receiving connectors; the second egg support structure having a center lifting structure with a second elongated rectangular lifting assembly attachment slot with the longitudinal axis thereof directed between the four support legs such that when the support legs of the second interconnectable egg support structure are inserted into the four support leg receiving connectors of the first interconnectable egg support structure, the first and second elongated rectangular lifting assembly attachment slots are in registration, and the oval-shaped egg supports of the second interconnectable egg support structure are positioned above the spaces between the oval-shaped egg supports of the first interconnectable egg support structures in a manner to maximize the number of eggs positioned within a given height of a boiling pot; the flexible, two-sided, attachment hook being of a length, orientation and flexibility to flex and pass through each of the first and second elongated rectangular lifting assembly attachment slots only in a first direction and sufficiently inflexible to transmit a lifting force in a direction opposite the first direction sufficient to lift the first and second interconnectable egg support structures.

It is noted that the embodiment of the in-pot egg support system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A boiling pot egg support system comprising:

a lifting assembly; and first and second interconnectable egg support structures;

said lifting assembly including a telescoping center section with a rectangular cross section and a flexible, two-sided, lifting hook;

said first and second interconnectable egg support structures each having a perimeter rim, a center lifting structure, six equally spaced, oval-shaped, egg supports fixed between said perimeter rim and said center lifting structure, four support legs extending from said bottom side of said perimeter rim, and four support leg receiving connectors extending from said top side of said perimeter rim;

said first egg support having a center lifting structure with a first and elongated rectangular lifting assembly attachment slot sized to form a keyway for receiving said telescoping center section of said lifting assembly;

said longitudinal axis of said first elongated rectangular lifting assembly attachment slot being directed between said four support leg receiving connectors;

said second egg support structure having a center lifting structure with a second elongated rectangular lifting assembly attachment slot with said longitudinal axis thereof directed between said four support legs such that when said support legs of said second interconnectable egg support structure are inserted into said four support leg receiving connectors of said first interconnectable egg support structure, said first and second elongated rectangular lifting assembly attachment slots are in registration, and said oval-shaped egg supports of said second interconnectable egg support structure are positioned above said spaces between said oval-shaped egg supports of said first interconnectable egg support structures in a manner to maximize said number of eggs positioned within a given height of a boiling pot;

said flexible, two-sided, attachment hook being of a length, orientation and flexibility to flex and pass through each of said first and second elongated rectangular lifting assembly attachment slots only in a first direction and sufficiently inflexible to transmit a lifting force in a direction opposite said first direction sufficient to lift said first and second interconnectable egg support structures.

* * * * *